Aug. 13, 1963
H. O. EGLI
3,100,348
COMPENSATED MICROMETER HEAD
Filed April 11, 1960
2 Sheets-Sheet 2
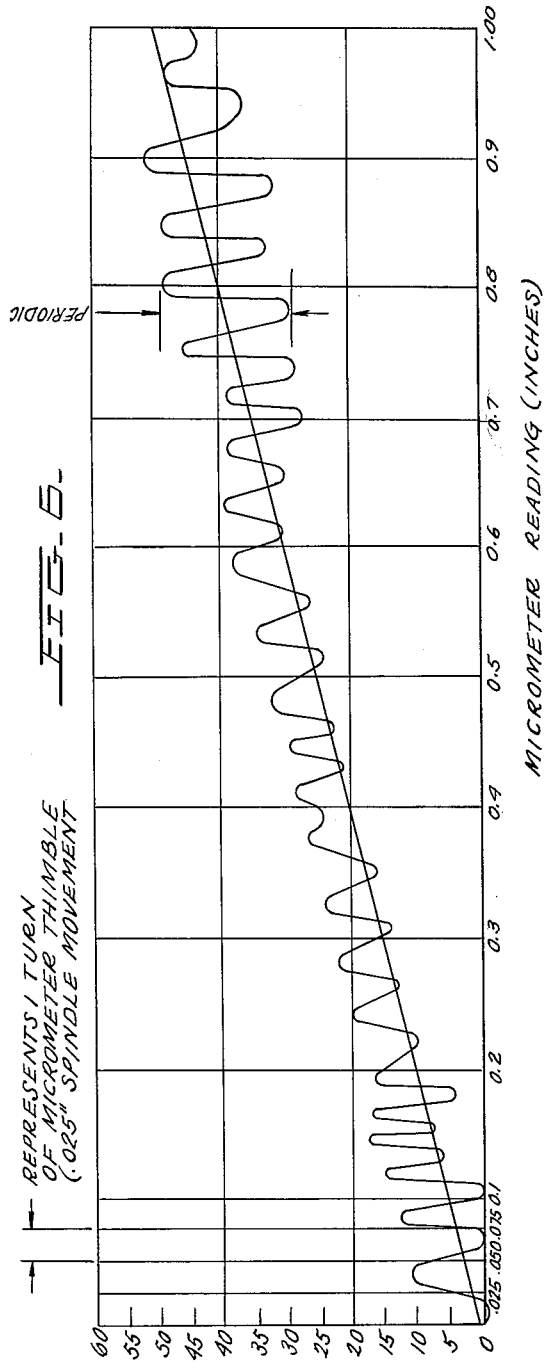
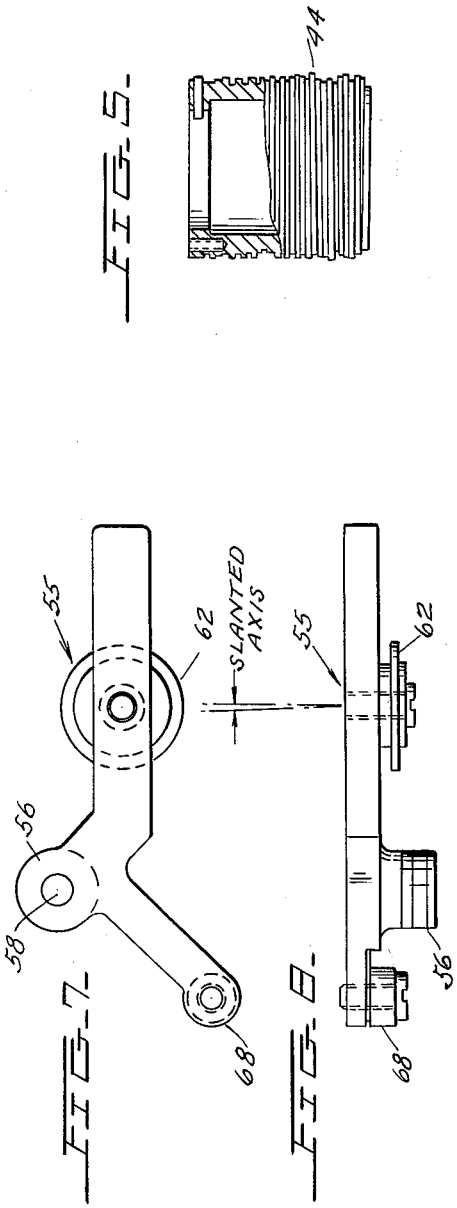
INVENTOR.
HENRY O. EGLI
BY
OSTROLENK, FABER, GERB & SOFFEN
ATTORNEYS

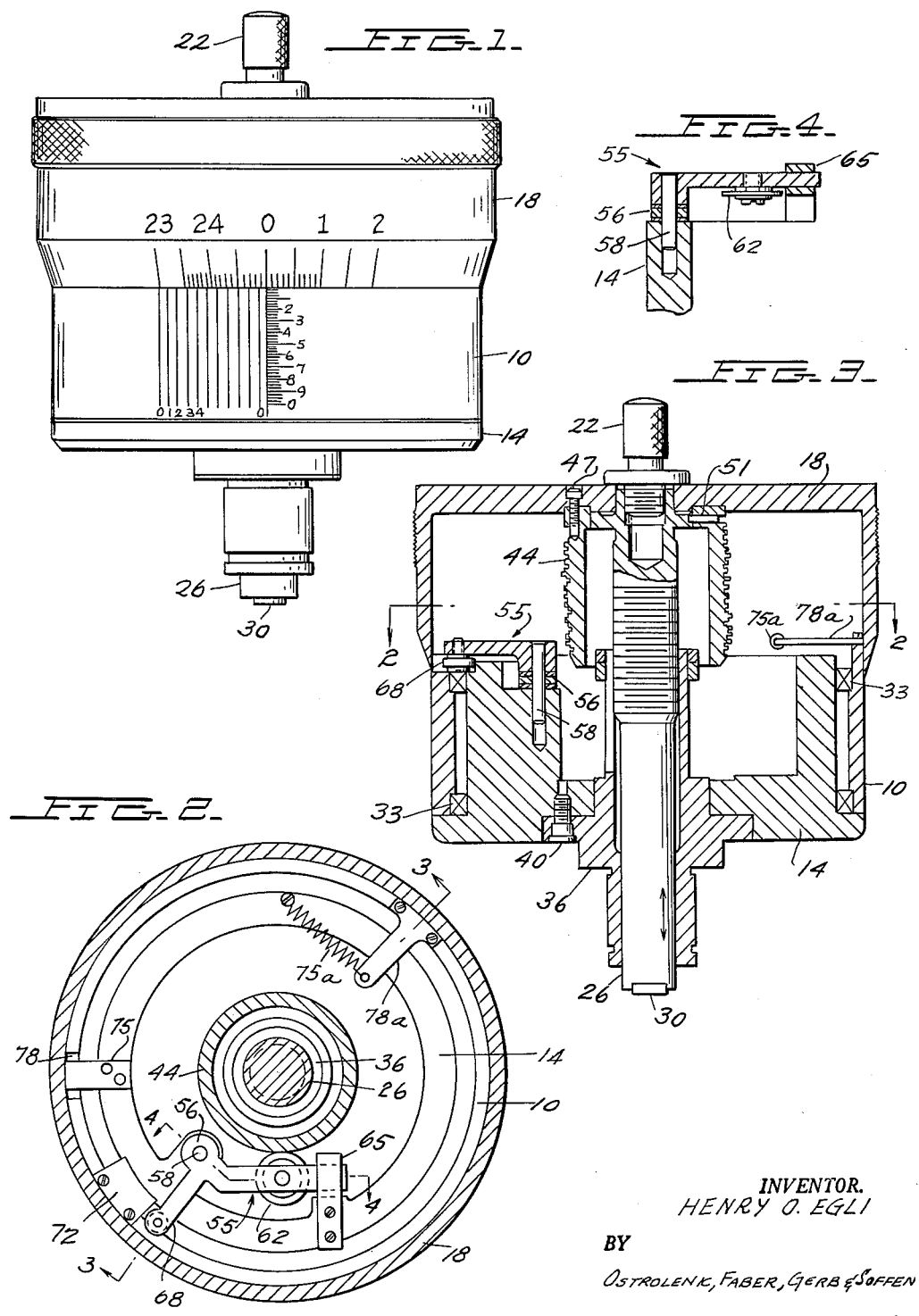

United States Patent Office 3,100,348
Patented Aug. 13, 1963

3,100,348
COMPENSATED MICROMETER HEAD
Henry O. Egli, Riverside Drive, Sidney, N.Y.
Filed Apr. 11, 1960, Ser. No. 21,218
9 Claims. (Cl. 33—164)

This invention relates to micrometers and more particularly to means for compensating for the errors ordinarily encountered in micrometers due to unavoidable inaccuracies of tolerances and dimensions of parts in manufacture.

It is well known that ordinary micrometers having a threaded spindle are subject to inaccuracies due to variation in spindle thread coupled with inaccuracies of the components which coact therewith. Accordingly, it is an object of the invention to provide a micrometer head having certain novel elements which compensate for such inaccuracies. It is another object of the invention to provide a compensated micrometer head which may be manufactured in mass production by generally conventional equipment. It is a further object of the invention to provide a simple method of detecting inaccuracies in a micrometer head for the purpose of making a component to be incorporated in said head which compensates for such inaccuracies.

The invention contemplates the use of a standard precision gauge with certain additions and modifications as are needed to obtain the desired graph for the purpose of testing a micrometer head having the usual conventional components, and charting the errors detected during the course of travel of the anvil as compared with the scale readings. A precision gauge apparatus found suitable when modified as herein pointed out is, for example, a Pratt & Whitney Model B4 device capable of measurements to accuracies of a millionth of an inch. Apparatus of this type is generally used for measuring accuracy of gauge blocks and includes a recording chart which records deviations, or error, from nominal dimensions. By using such equipment and procuring the deviation or error chart therefrom for a specific micrometer head, a thread grinding machine or thread cutting lathe may be set up to cut a thread in a cam collar wherein the depth of thread corresponds to the deviations as amplified found along the length of travel of the micrometer anvil as compared with nominal readings on the scales of such micrometer. Thus, a cam component so made may be incorporated in a combination comprising many of the conventional elements of a micrometer in a manner to be hereinafter disclosed, to effect truer scale readings. For example, by providing a rotative barrel around the normally fixed body of the micrometer which barrel carries the usual vernier scale, and effecting slight rotation of such barrel in accordance with varying cam surface undulations of a compensating cam element rotated with the micrometer thimble, such barrel may be given reversible rotary motion continuously as the anvil travels. Thus, the reading of the vernier scale thereon will correspond much more closely to the actual anvil position to any particular point than would be the case otherwise.

A detailed description of the invention will now be given in conjunction with the appended drawings.

FIGURE 1 is an elevation showing the micrometer head of the invention;

FIGURE 2 is a cross section taken generally through 2—2 of FIGURE 3;

FIGURE 3 is a section taken through 3—3 of FIGURE 2;

FIGURE 4 is a section taken through 4—4 of FIGURE 2;

FIGURE 5 is a view of the compensating threaded cam collar which is an essential feature of the invention, shown partially in section;

FIGURE 6 is a graph showing the continuous reading error found in ordinary micrometer heads as the anvil travels;

FIGURE 7 is an enlarged plan of the actuating arm which forms part of the novel combination; and FIGURE 8 is an elevation of the arm.

As seen in FIGURE 1, the micrometer head appears to be of generally conventional construction. However, in this instance, the vernier carrying barrel or collar 10 has slight reversible rotary motion with respect to the fixed barrel or body 14. The head also has a conventional thimble 18, a lock screw 22, a spindle 26 secured to the thimble and an anvil 30, the anvil being carried in conventional manner by the spindle.

It will be noted that the member 10 as seen in FIGURE 2 is in the form of a collar which carries vernier scales to coact in the usual manner with the rotational scale carried by the thimble 18. In fact, insofar as many components are concerned the micrometer is conventional except for my improvement which renders it accurate to within millionths of an inch. Such improvement comprises the scale carrying collar 10 which is carried by means of suitably spaced bearings 33 in the body 14, concentrically therewith. Thus, barrel 10 carrying the vernier scales is relatively rotative in either direction with respect to both spindle 26 and body 14. In the particular illustration the micrometer head is of the type wherein the body 14 is relatively stationary and has secured thereto a threaded sleeve or nut 36 through which the spindle 26 passes for a threaded coaction therewith in the usual manner so that when thimble 18 is rotated the anvil 30 traverses a predetermined extent in either direction depending on the directional rotation of the thimble. Sleeve 36 and body 14 are suitably secured together as by one or more machine screws 40.

Carried by thimble 18 is a collar or drum cam 44, being secured to the thimble at its upper edge as by machine screws 47 and located radially relative to spindle 26 by a key 51. The surface of cam 44 appears to have a generally threaded configuration, more clearly seen in FIGURE 5, but it will be understood that the lands of the thread are at different radii with respect to the axis of the cam. The cutting of the cam is accomplished to correspond to the error or inaccuracy of the mechanism which effects motion of the anvil. Thus, in this instance, inaccuracies, such as the lead error of the micrometer screw, both accumulative and periodic, plus errors introduced by interaction of the thread on spindle 26 and the nut section 36, may be made to manifest themselves through a precise gauging machine such as the Pratt & Whitney hereinabove mentioned, or any equivalent apparatus. Detection of such inaccuracies can be made to produce a graph or chart as shown in FIGURE 6 where for continuous traverse of the anvil for micrometer reading of zero to 1.00 inch on the abscissa, the continuous record of inaccuracy as shown on the ordinate of the graph is revealed. Thus, the curve on the graph is of an oscillatory nature which shows cumulative error as a general rising curve in conjunction with a periodic error represented by the undulations which make up the generally rising curve. By means of such a graph procured from testing a specific micrometer head, having all of the components which relate to non-compensated error, a tape may be prepared for use in a conventional, numerically controlled thread cutting lathe or thread grinding machine order to cut a specific compensating cam 44. Thus, the initial step would be to assemble the micrometer head substantially as shown in FIGURE 3 except, of course, the error compensating cam 44, and a follower arm 55 to be hereinafter described. The barrel 10 would be held in a fixed rotative position during this calibration at the point where rotative clearances would allow for equal correction for either a positive or negative error. The assembly produces a continuous curve of inaccuracy in a precision gauge apparatus which yields a continuous error graph as shown in FIGURE 6, for a specific head tested. The graph of FIGURE 6 would then be transformed to a tape for cutting the continuous undulating depth cam spiral groove of cam 44. This can be accomplished by contour follower machines from a prepared template, numerically controlled cutting machines, photoelectric controlled cutting machines, etc. In any event, once cam 44 has been prepared so that the spiralling cam surface corresponds to the continuous error between the actual position of anvil 30 of the scale readings on the thimble 18 and scale carrying barrel 10 the cam may be mounted within the thimble for coaction with the cam follower element 55, described hereinbelow.

Referring to FIGURE 2 it will be noted that body 14 carries a bell crank lever 55 suitably secured by pivot pin 58, the bell crank being supported on a suitable thrust bearing 56 as shown. One arm of the lever carries a roller-like cam follower 62 which is in the form of a thin roller or disc having bolted bearing connection (FIGURE 8) with the lever. The rim or marginal portion of the disc 62 is disposed between the ridges of the cam 44 so as to engage the cam surface land therebetween. It will be understood that the axis of follower roller 62 slants (FIGURE 8), to conform to the slant of the ridges so as to fit smoothly therebetween and to have a smooth rolling fit with respect to the land surface which it engages. From the foregoing it will be apparent that rotation of cam 44 will effect rocking of lever 55.

The end of the arm of the lever 55 which carries follower 62 extends into a bifurcated element 65 for guidance; guide element 65 is carried by fixed body 14, as by screw securement shown. The other arm of the lever carries a suitable rotative follower roller 68 engageable with an abutment cam 72 fastened to and carried by rotative barrel 10. Accordingly, it will be appreciated that if the lever should be rocked clockwise by engagement of a rising portion of the land of the cam with follower 62, follower 68 will exert a force on abutment 72 to rotate barrel 10 in the same direction. However, to maintain cam 72 against roller or follower 68 a tension spring 75 is utilized extending between a suitably located fastening on body 14 and the end of a T shaped arm 78 which will be seen to be secured to collar 10 and extending radially therein. Thus, the direction of pull of the spring is counterclockwise on rotative collar 10 maintaining elements 68 and 72 in abutment with each other and likewise maintaining follower 62 in abutment with the land on cam 44.

From the above it will now be understood that any movement of anvil 30 will necessarily be effected by rotation of thimble 18, but that rotation of such thimble will also effect rotation of cam 44. Accordingly, regardless of where anvil 30 may be in its traverse, some portion of the continuous spiral land of the cam will be engaging follower 62. At any position of the anvil, if the depth of the land of the cam 44 conforms to the amplified error as registered on the micrometer thimble (see chart of FIGURE 6) for a particular micrometer head and bell crank 55 will effect error compensating rotation of the scale carrying collar 10 so that a proper and correct reading of the scale thereon, conforming to the actual position of anvil 30, will be realized.

It will, of course, be understood, that depending upon the configuration and design of lever 55 and desired direction of swing in order to predetermine the direction of rotational movement of barrel 10, the land will either be radially positive or negative from a zero or no error position. In any event, for any particular point of traverse of the anvil 30, if the scale, due to inaccuracies of the mechanism reads low as determined by the precision gauge hereinabove described, the land on cam 44 would either rise or fall depending on the design of the mechanism to effect movement of collar 10 so as to give an increased and correct reading.

As seen on FIGURE 2, a safeguard is utilized to prevent forced injurious movement of collar 10. Such safeguard is comprised of a stop bar 75 secured as by screws to the fixed body 14 and extending into a slot 78 rotatable collar 10. Thus, the play between the sides of the stop bar and the sides of the slot is sufficient to take care of any degree of rocking of bell crank 55 but will prevent forced movement of collar 10 which may tend to injure or break the mechanism.

It will be appreciated that the principles of the invention described hereinabove are applicable to various kinds of micrometer heads and are not limited to the rotating spindle type as herein disclosed. Various changes may be made by persons skilled in the art within the scope of the invention and I do not seek to be limited to the precise illustration herein given except as set forth in the appended claims.

I claim:

1. In a micrometer, a head mechanism comprising a body member and a spindle having a threaded connection therewith and having rotative and reciprocal movement with respect thereto, an anvil actuated by said spindle and positioned by movement of said spindle, a scale carrying element carried by said body member and being mounted for relative rotative movement with respect to said spindle and said body member, said scale being calibrated to indicate traverse of said anvil, a drum cam having a cam surface and being integrally secured to said spindle and movable rotatively and reciprocally therewith, said cam surface comprising a continuous thread, a cam follower means disposed and arranged to engage said cam surface and connected with said scale carrying element for effecting movement of said element corresponding to rise and fall of said cam surface as said spindle is rotated, said cam surface having varying rise and fall to compensate for inaccuracies of the thread connection intermediate said spindle and said body member whereby to compensatingly position said scale carrying element so as to minimize error.

2. In a device as set forth in claim 1, said drum cam being concentrically disposed around said spindle, said body member having an internal cavity, said drum cam being movable into said cavity as said spindle reciprocates.

3. In a device as set forth in claim 1, including an indexing thimble integrally secured concentrically to said spindle and having a skirt concentrically surrounding said scale carrying element and being reciprocal with said spindle to move axially relative to said scale carrying element, said drum cam concentrically surrounding said spindle inwardly of said thimble.

4. In a device as set forth in claim 1, said cam follower means comprising a bell crank lever having a pivotal fulcrum connection on said body member, one end of said lever carrying a roller engaging said cam surface and another end of said lever having a pivotal connection with said scale carrying element.

5. In a device as set forth in claim 1, said cam surface comprising the land of the thread of said cam drum, said land having radial variation with respect to the axis of said cam drum.

6. In a device as set forth in claim 1, said drum cam being concentrically disposed around said spindle, said body member having an internal cavity, said drum cam being movable into said cavity as said spindle reciprocates, including an indexing thimble integrally secured concentrically to said spindle and having a skirt concentrically surrounding said scale carrying element, and being reciprocal with said spindle to move axially relative to said scale carrying element, said drum cam concentrically surrounding said spindle inwardly of said thimble.

7. In a device as set forth in claim 1, said cam follower means comprising a bell crank lever within said body member having a pivotal fulcrum connection on said body member, one end of said lever carrying a roller engaging said cam surface and another end of said lever having a pivotal connection with said scale carrying element, said cam surface comprising the land of the thread of said cam drum, said land having radial variation with respect to the axis of said cam.

8. In a device as set forth in claim 1, said drum cam being cencentrically disposed around said spindle, said body member having an internal cavity, said drum cam being movable into said cavity as said spindle reciprocates, including an indexing thimble integrally secured concentrically to said spindle and having a skirt concentrically surrounding said scale carrying element, and being reciprocal with said spindle to move axially relative to said scale carrying element, said drum cam concentrically surrounding said spindle inwardly of said thimble, said cam follower means comprising a bell crank lever within said body member having a pivotal fulcrum connection on said body member, one end of said lever carrying a roller engaging said cam surface and another end of said lever having a pivotal connection with said scale carrying element.

9. In a device as set forth in claim 1, said drum cam being concentrically disposed around said spindle, said body member having an internal cavity, said drum cam being movable into said cavity as said spindle reciprocates, including an indexing thimble integrally secured concentrically to said spindle and having a skirt concentrically surrounding said scale carrying element, and being reciprocal with said spindle to move axially relative to said scale carrying element, said drum cam concentrically surrounding said spindle inwardly of said thimble, said cam follower means comprising a bell crank lever within said body member having a pivotal fulcrum connection on said body member, one end of said lever carrying a roller engaging said cam surface and another end of said lever having a pivotal connection with said scale carrying element, said cam surface comprising the land of the thread of said cam drum, said land having radial variation with respect to the axis of said cam.

References Cited in the file of this patent

UNITED STATES PATENTS

| | | |
|---|---|---|
| 2,448,473 | Shrewsbury | Aug. 31, 1948 |
| 2,612,697 | Mathson | Oct. 7, 1952 |